US012658542B2

(12) United States Patent
Kim et al.

(10) Patent No.: US 12,658,542 B2
(45) Date of Patent: Jun. 16, 2026

(54) RIVETING STRUCTURE OF ELECTRODE TERMINAL, AND SECONDARY BATTERY, BATTERY PACK, AND AUTOMOBILE COMPRISING SAME

(71) Applicant: LG ENERGY SOLUTION, LTD., Seoul (KR)

(72) Inventors: Jaewoong Kim, Daejeon (KR); Do Gyun Kim, Daejeon (KR); Kwang Su Hwang Bo, Daejeon (KR); Geon Woo Min, Daejeon (KR); Minki Jo, Daejeon (KR); Suji Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 561 days.

(21) Appl. No.: 18/027,053

(22) PCT Filed: Feb. 18, 2022

(86) PCT No.: PCT/KR2022/002437
§ 371 (c)(1),
(2) Date: Mar. 17, 2023

(87) PCT Pub. No.: WO2022/177356
PCT Pub. Date: Aug. 25, 2022

(65) Prior Publication Data
US 2023/0327303 A1 Oct. 12, 2023

(30) Foreign Application Priority Data
Feb. 19, 2021 (KR) ........................ 10-2021-0022867

(51) Int. Cl.
*H01M 50/567* (2021.01)
*H01M 10/04* (2006.01)
(Continued)

(52) U.S. Cl.
CPC ..... *H01M 50/567* (2021.01); *H01M 10/0422* (2013.01); *H01M 10/0431* (2013.01);
(Continued)

(58) Field of Classification Search
CPC ............ H01M 50/567; H01M 50/559; H01M 50/188; H01M 50/213; H01M 10/0422; H01M 10/0431; H01M 2220/20
See application file for complete search history.

(56) References Cited

U.S. PATENT DOCUMENTS 6,132,900 A 10/2000 Yoshizawa et al.
2005/0287432 A1 12/2005 Cheon et al.
(Continued)

FOREIGN PATENT DOCUMENTS

CN 1581533 A 2/2005
CN 2681364 Y 2/2005
(Continued)

OTHER PUBLICATIONS

JP2012124008 translation (Year: 2012).*
(Continued)

*Primary Examiner* — Jane J Rhee
(74) *Attorney, Agent, or Firm* — Birch, Stewart, Kolasch & Birch, LLP

(57) ABSTRACT

A riveting structure of an electrode terminal includes a battery can, an electrode terminal riveted through a through-hole formed in a bottom of the battery can, and a gasket between the battery can and the electrode terminal, in which the electrode terminal includes a body portion inserted into the through-hole, an outer flange portion extending along an outer surface of the bottom of the battery can and an inner flange portion extending toward an inner surface of the bottom of the battery can, in which the body portion and the outer flange portion respectively have inner cavities con- (Continued)

nected to each other, and in which the inner flange portion has an opening portion connected to the inner cavities and opened in a direction toward the inside of the battery can.

16 Claims, 14 Drawing Sheets

(51) Int. Cl.
  *H01M 50/188*          (2021.01)
  *H01M 50/213*          (2021.01)
  *H01M 50/559*          (2021.01)
(52) U.S. Cl.
  CPC ....... *H01M 50/188* (2021.01); *H01M 50/213* (2021.01); *H01M 50/559* (2021.01); *H01M 2220/20* (2013.01)

(56)                References Cited

U.S. PATENT DOCUMENTS

| | | | |
|---|---|---|---|
| 2008/0038627 | A1 | 2/2008 | Yamauchi et al. |
| 2009/0004559 | A1* | 1/2009 | Gardner .............. H01M 50/566 219/121.64 |
| 2009/0029240 | A1 | 1/2009 | Gardner et al. |
| 2010/0266893 | A1 | 10/2010 | Martin et al. |
| 2011/0117398 | A1 | 5/2011 | Kang |
| 2014/0363731 | A1 | 12/2014 | Tanaka et al. |
| 2020/0365856 | A1* | 11/2020 | Kim .................... H01M 50/593 |
| 2022/0037747 | A1 | 2/2022 | Lee |
| 2023/0327303 | A1 | 10/2023 | Kim et al. |

FOREIGN PATENT DOCUMENTS

| | | | |
|---|---|---|---|
| CN | 103199212 | A | 7/2013 |
| CN | 217306617 | U | 8/2022 |
| JP | 3-203157 | A | 9/1991 |
| JP | 5-190160 | A | 7/1993 |
| JP | 8-180849 | A | 7/1996 |
| JP | 8-287896 | A | 11/1996 |
| JP | 11-102688 | A | 4/1999 |
| JP | 2001-210284 | A | 8/2001 |
| JP | 2004-303739 | A | 10/2004 |
| JP | 2010-529624 | A | 8/2010 |
| JP | 2012-124008 | A | 6/2012 |
| JP | 5084205 | B2 | 11/2012 |
| JP | 2013-149476 | A | 8/2013 |
| JP | 2018-139190 | A | 9/2018 |
| JP | 2018-139191 | A | 9/2018 |
| KR | 10-2005-0121914 | A | 12/2005 |
| KR | 10-2011-0054661 | A | 5/2011 |
| KR | 10-2014-0016232 | A | 2/2014 |
| KR | 10-1877008 | B1 | 7/2018 |
| KR | 10-2020-0035739 | A | 4/2020 |

OTHER PUBLICATIONS

Extended European Search Report for European Application No. 22756554.6, dated Aug. 5, 2024.
International Search Report for PCT/KR2022/002437 (PCT/ISA/210) mailed on May 30, 2022.
Japanese Office Action for Japanese Application No. 2023-517288, dated Apr. 15, 2024, with an English translation.

* cited by examiner

[Figure 1]
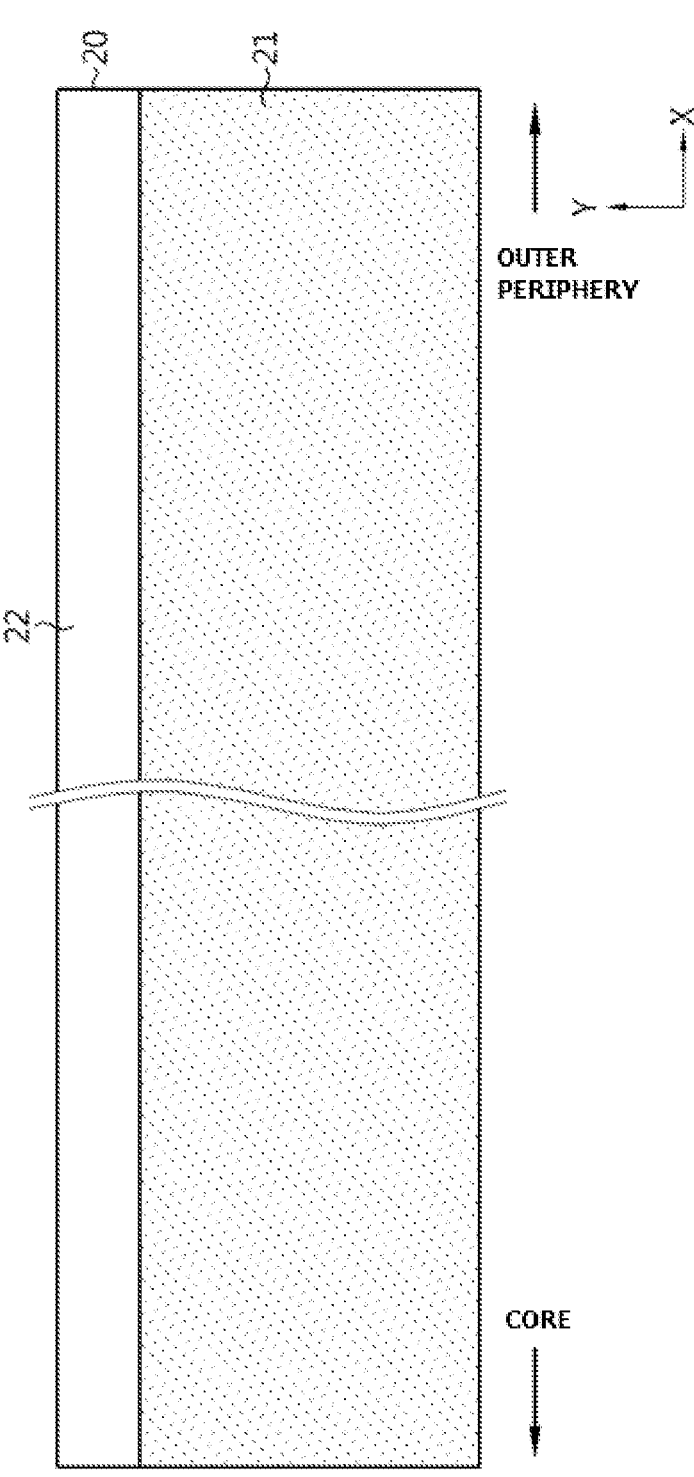

[Figure 2]
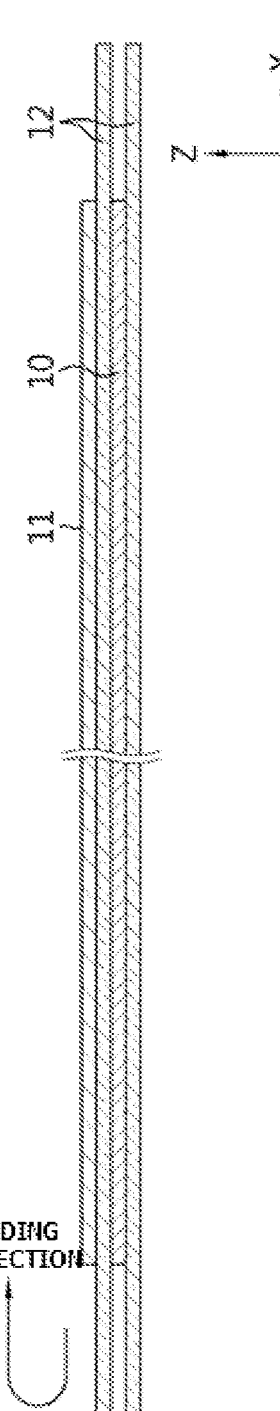

[Figure 3]
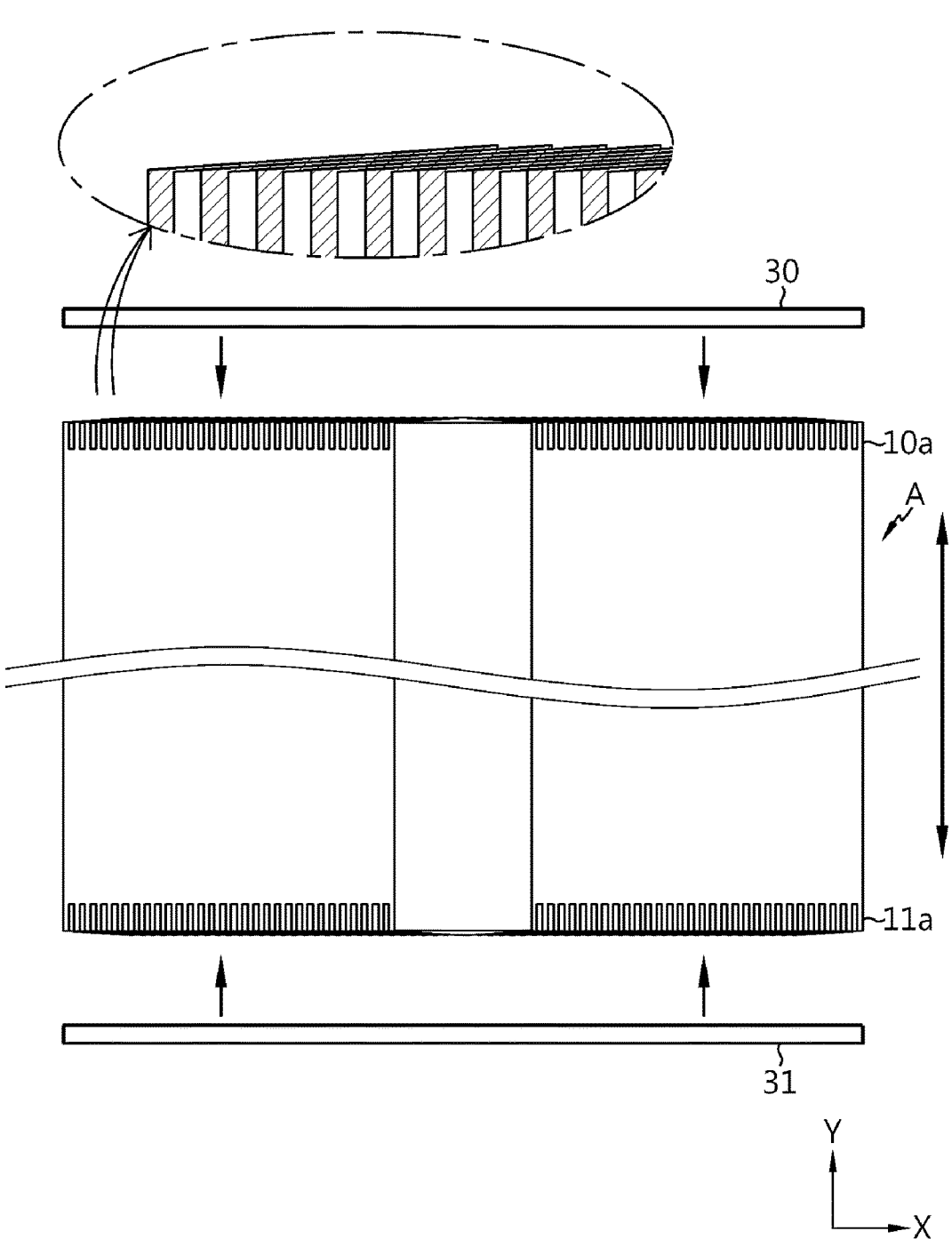

[Figure 4]
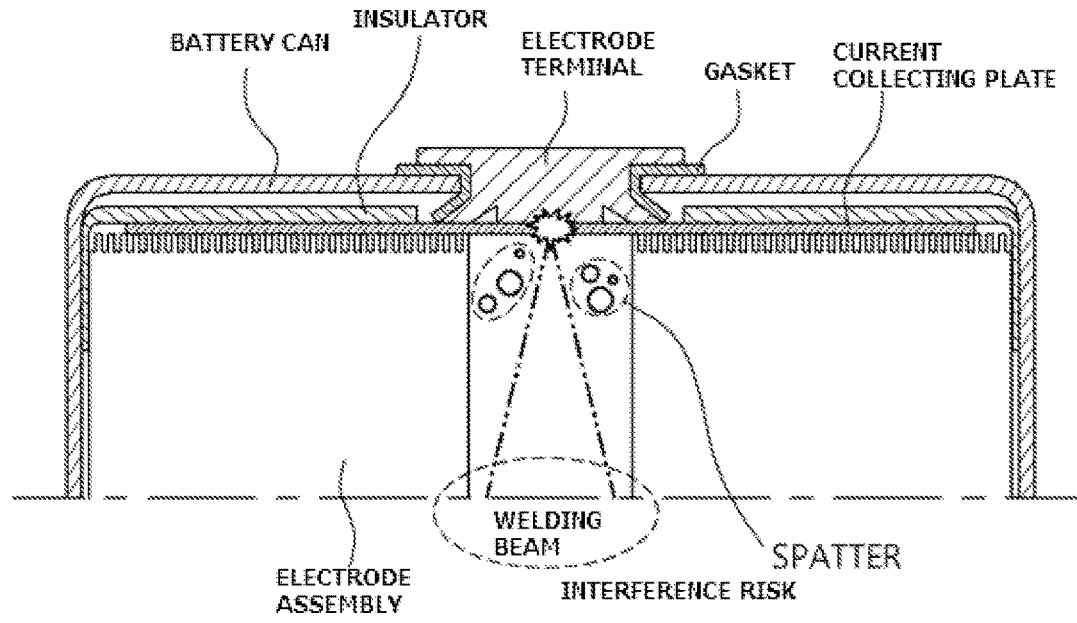

[Figure 5]
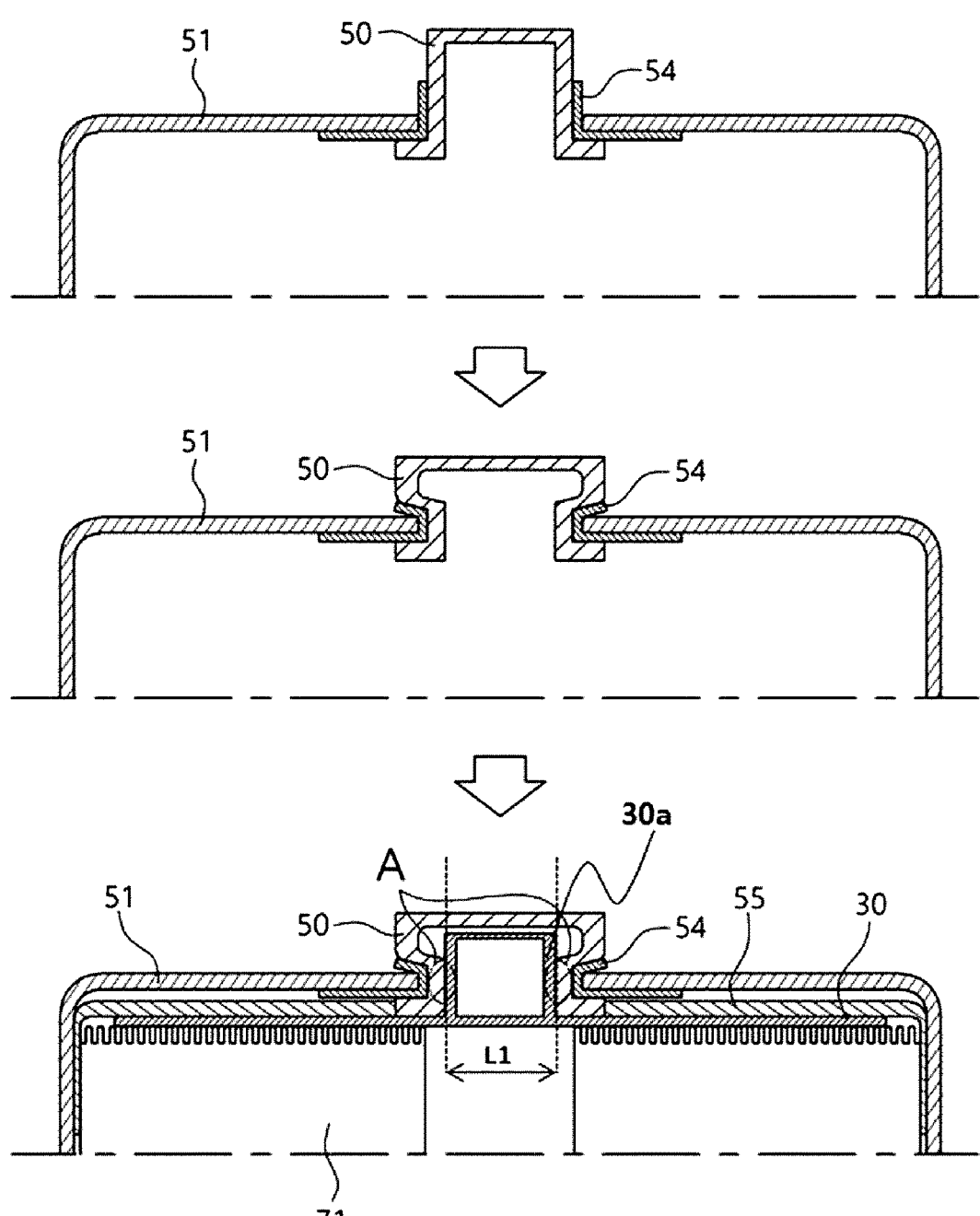

[Figure 6]
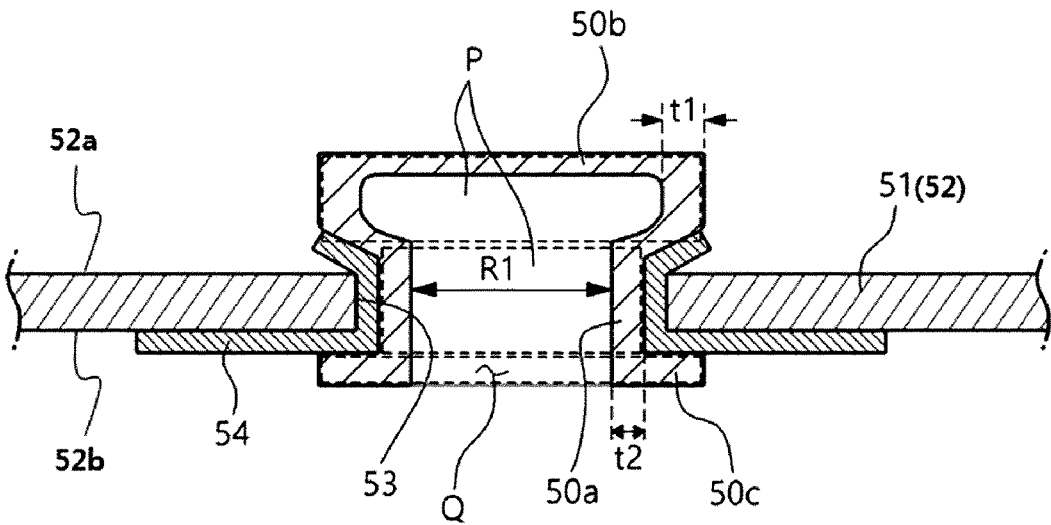

[Figure 7]
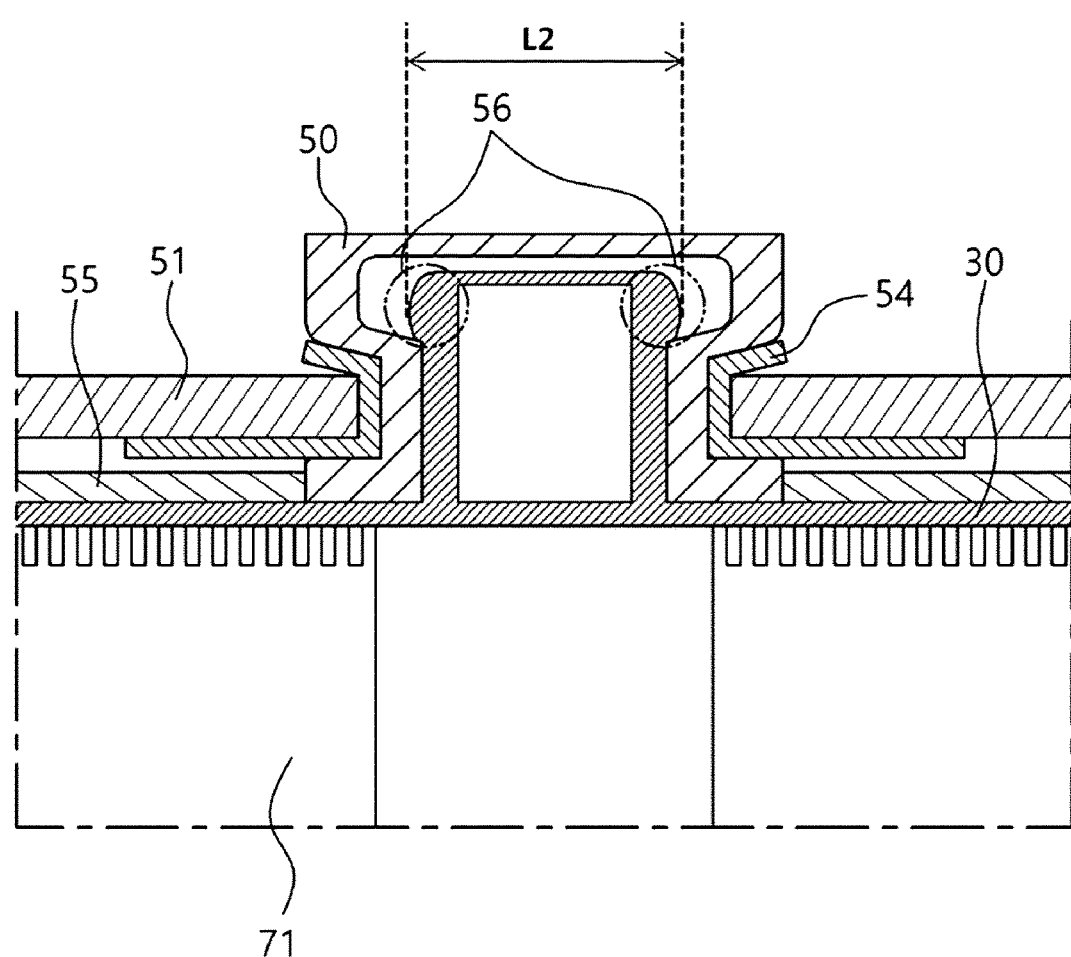

[Figure 8]
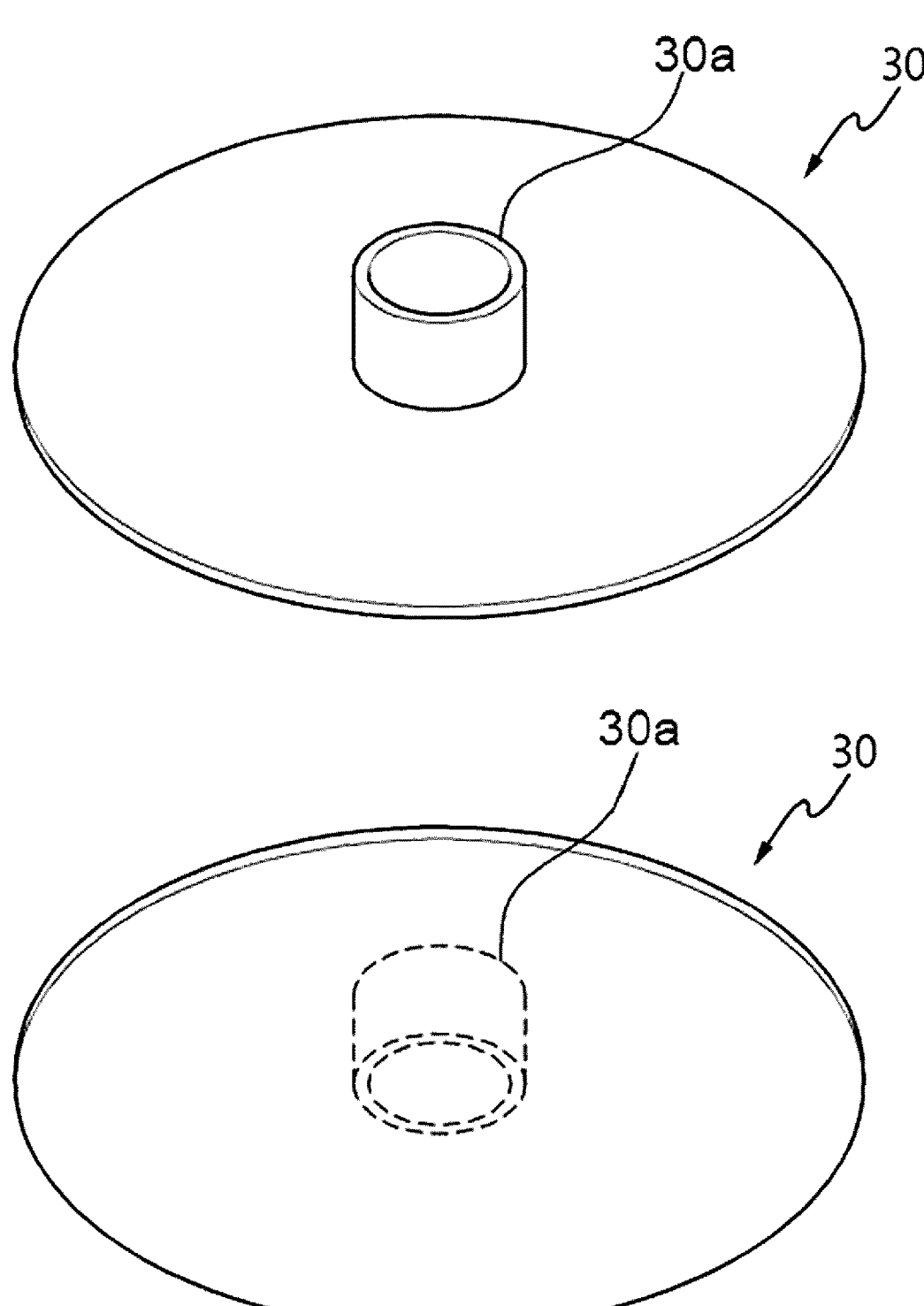

[Figure 9]
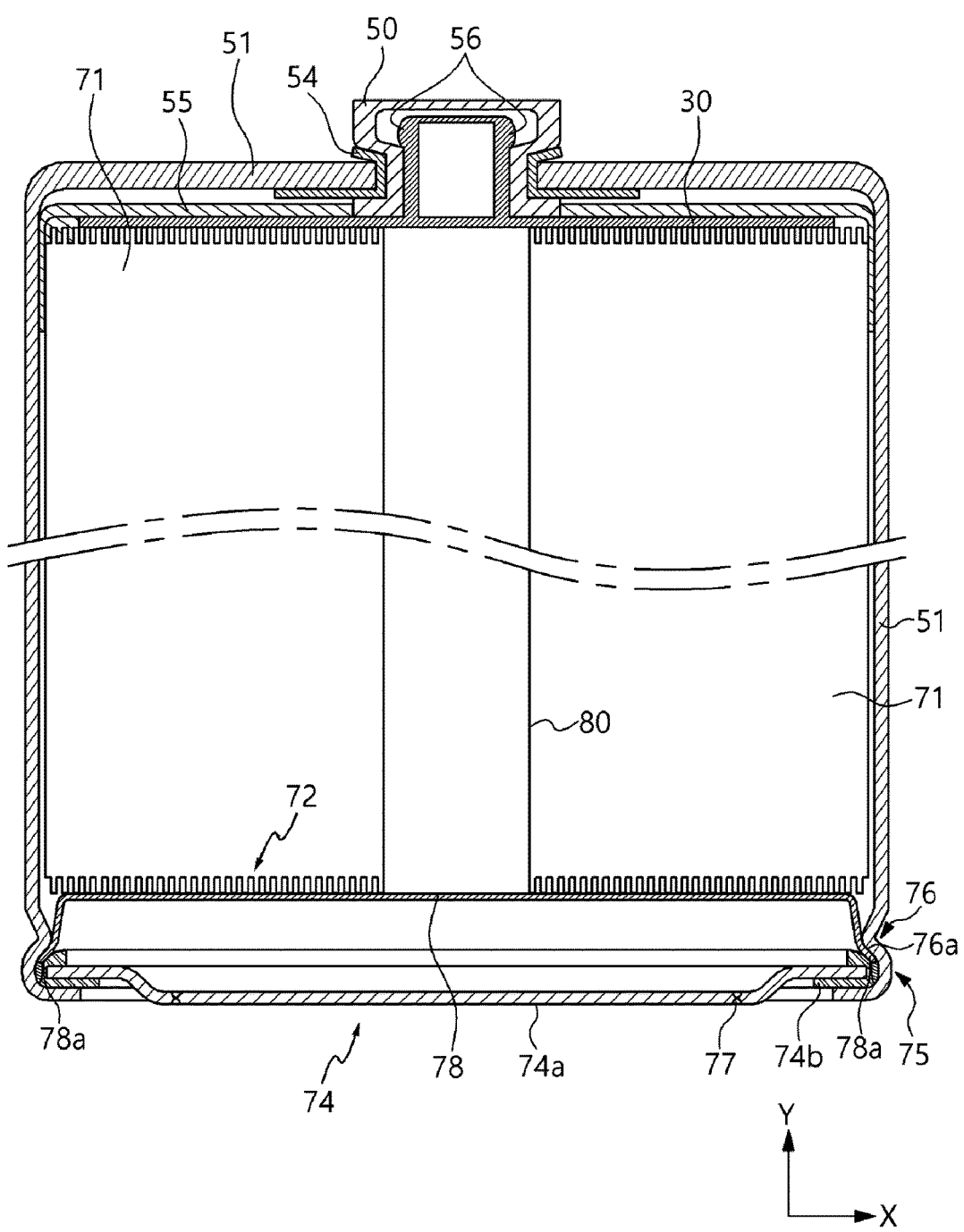

[Figure 10]
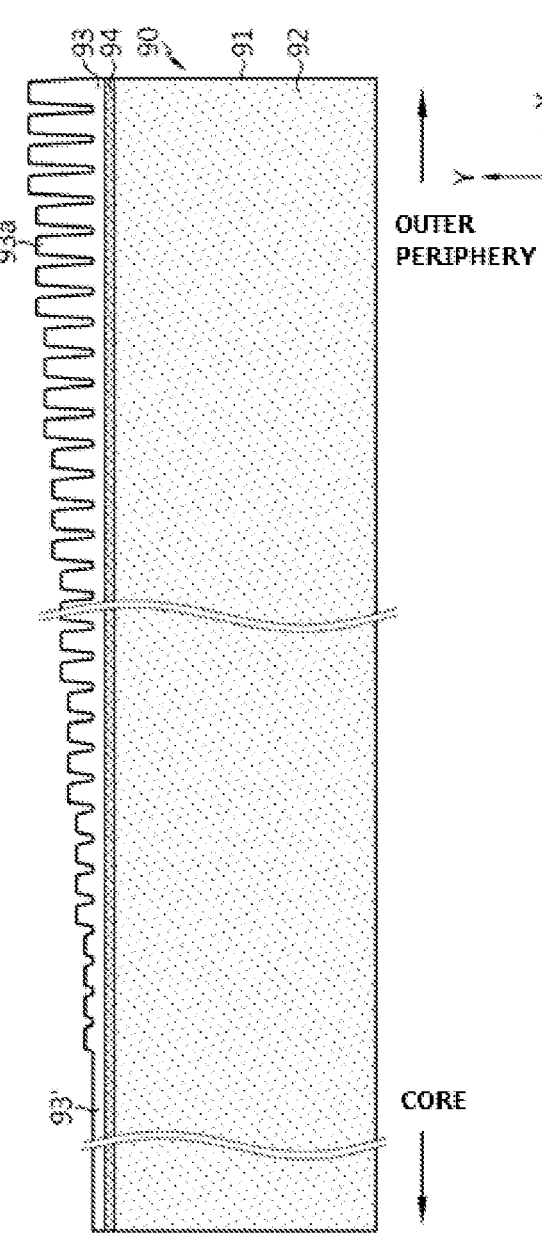

[Figure 11]
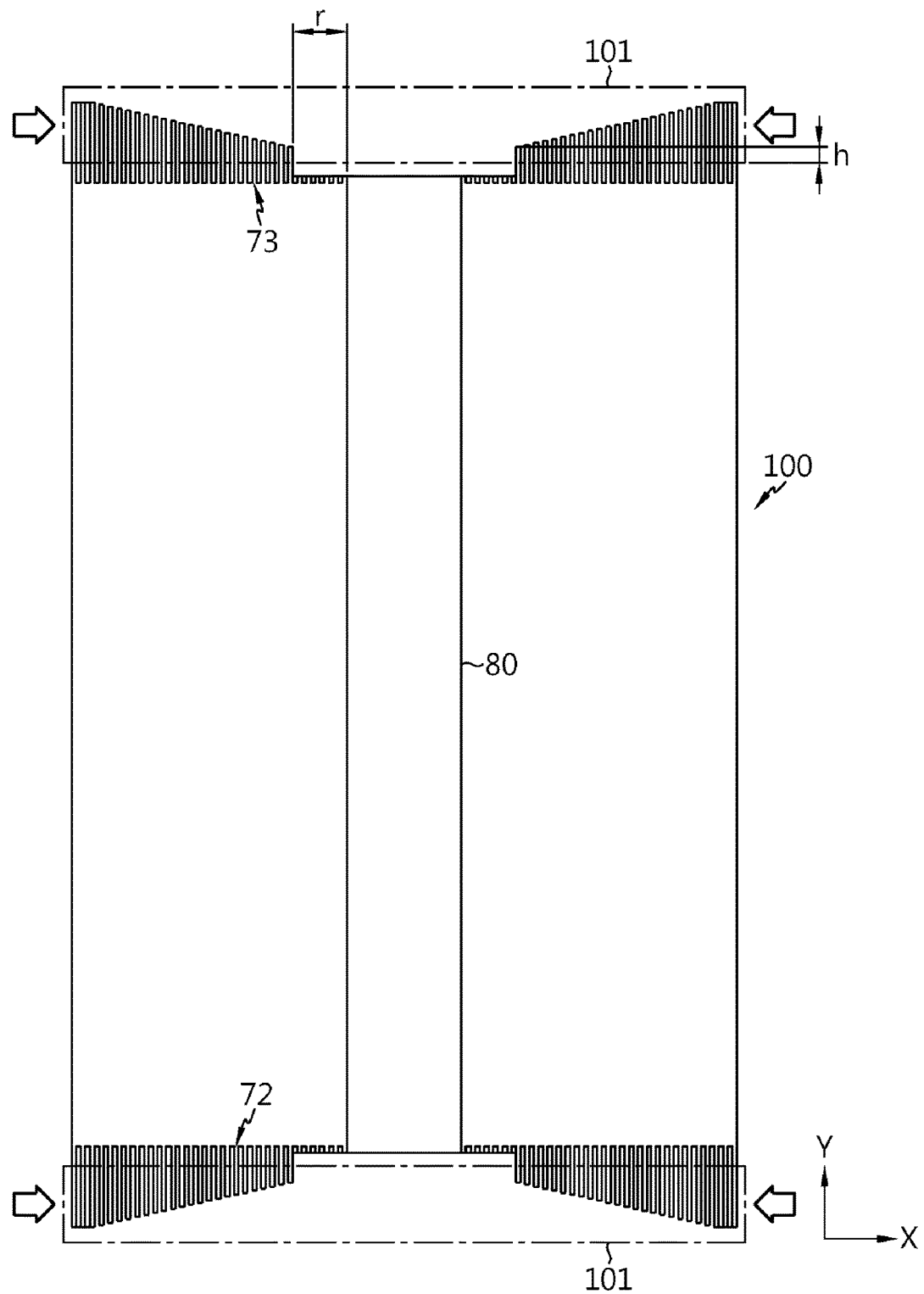

[Figure 12]
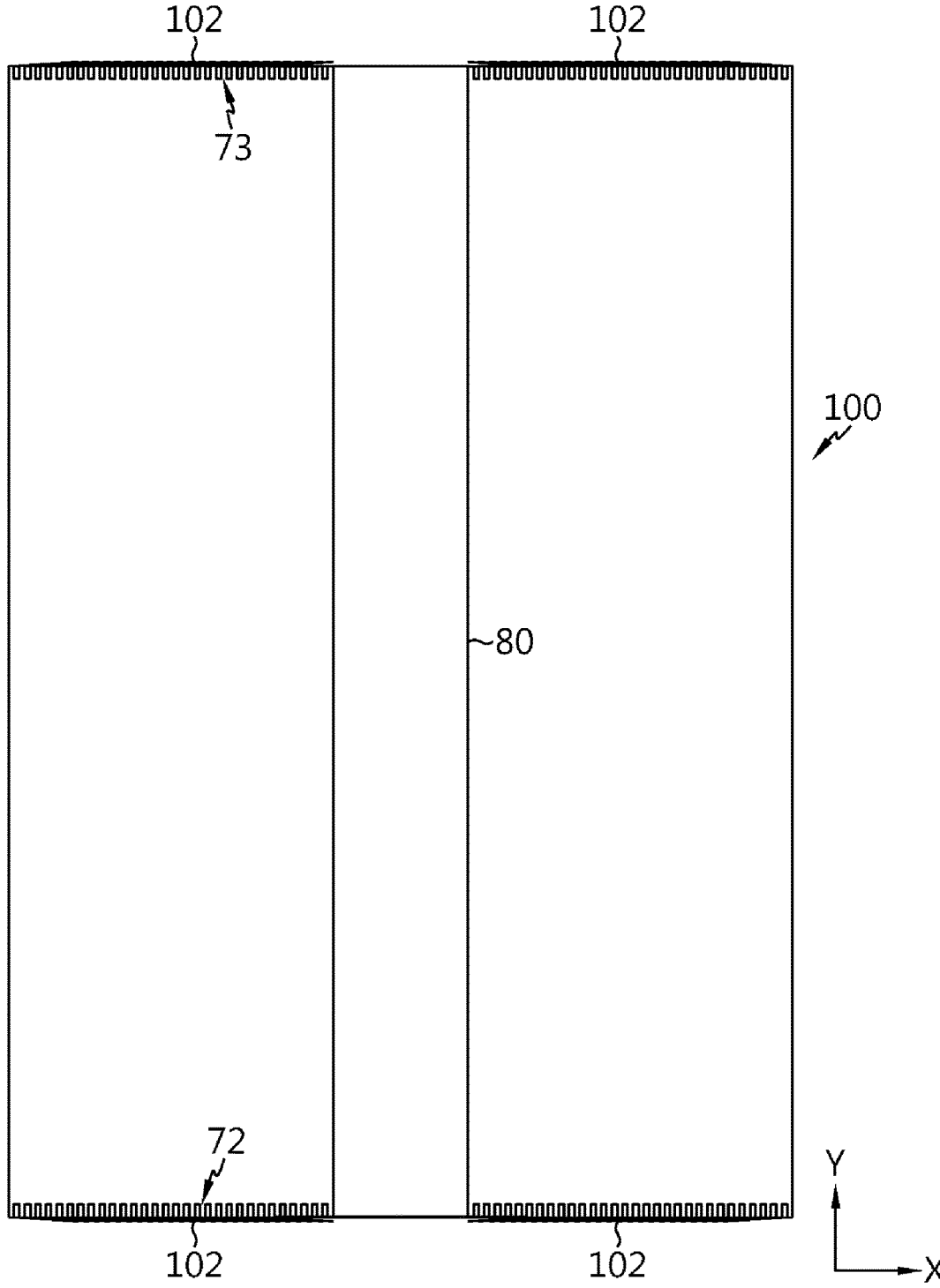

[Figure 13]
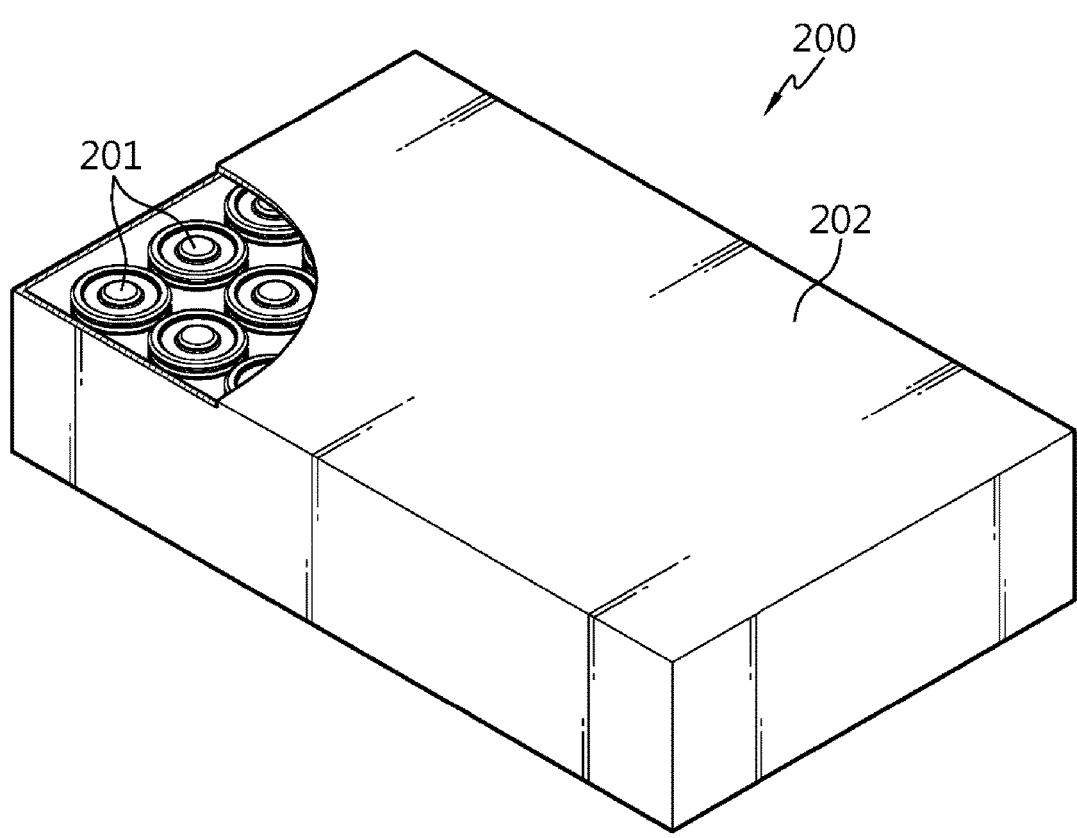

[Figure 14]
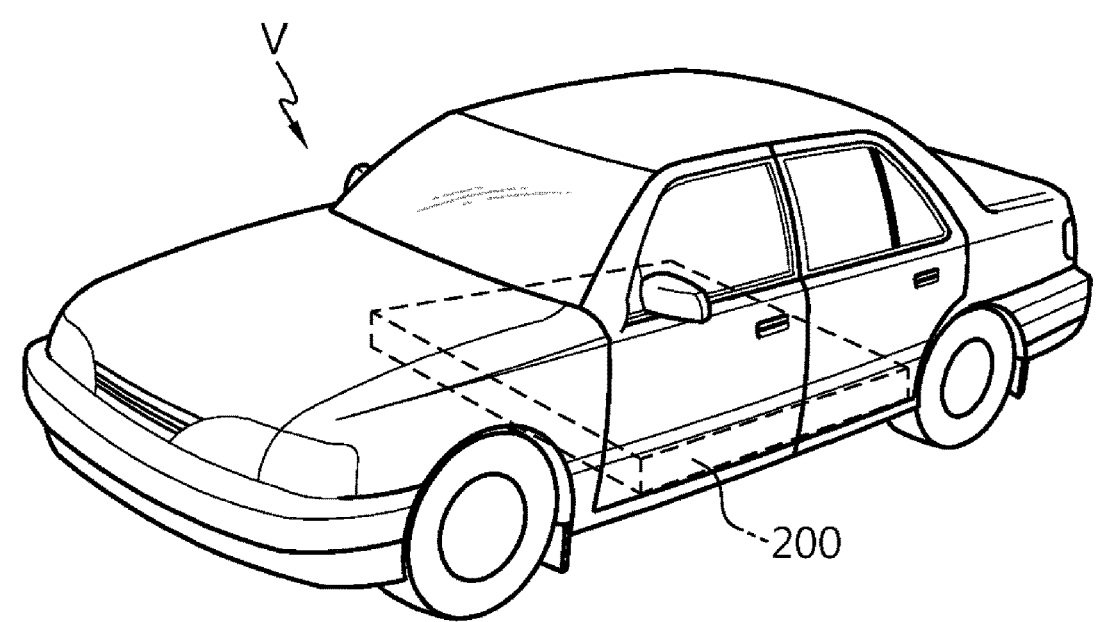

RIVETING STRUCTURE OF ELECTRODE TERMINAL, AND SECONDARY BATTERY, BATTERY PACK, AND AUTOMOBILE COMPRISING SAME

TECHNICAL FIELD

The present invention relates to a riveting structure of an electrode terminal, a secondary battery, a battery pack, and a vehicle including the same.

This application claims priority to and the benefit of Korean Patent Application No. 10-2021-0022867 filed with the Korean Intellectual Property Office on Feb. 19, 2021, the entire contents of which are incorporated herein by reference.

BACKGROUND ART

A secondary battery is easy to apply to product groups and has high electrical characteristics such as high energy density. Therefore, the secondary battery is widely applied not only to portable devices but also to electric vehicles (EVs) or hybrid electric vehicles (HEVs) driven by electrical driving sources.

The secondary battery attracts attention as a new energy source for improving environmental-friendly characteristics and energy efficiency because the secondary battery achieves a primary advantage of innovatively reducing the use of fossil fuel and does not generate any by-products from the use of energy.

Types of secondary batteries currently used widely include a lithium-ion battery, a lithium-polymer battery, a nickel-cadmium battery, a nickel-hydrogen battery, a nickel-zinc battery, and the like. An operating voltage of a unit secondary battery cell is about 2.5 V to 4.5 V. Therefore, when an output voltage higher than the operating voltage is required, a plurality of batteries is connected in series and constitutes a battery pack. In addition, the plurality of batteries is connected in parallel and constitutes the battery pack depending on a charge/discharge capacity required for the battery pack. Therefore, the number of batteries included in the battery pack and the type of electrical connection between the batteries may be variously set depending on required output voltages and/or charge/discharge capacities.

Meanwhile, cylindrical batteries, angular batteries, and pouch batteries are known as the types of secondary battery cells. The cylindrical battery is made by interposing a separator, which is an insulator, between a positive electrode and a negative electrode, rolling the assembly of the separator, the positive electrode, and the negative electrode to form an electrode assembly in the form of a jelly roll, and inserting the electrode assembly together with an electrolyte into a battery can.

In this case, there is also a structure in which a rivet-type positive electrode terminal, which penetrates a bottom surface of the battery can, is applied as the positive electrode terminal of the cylindrical secondary battery instead of a cap that is a sealing body configured to seal an opening port of the battery can in the related art. However, a welding process for coupling a positive electrode terminal and a positive electrode current collecting plate needs to be performed by a jelly-roll core, which makes it difficult to perform welding in a narrow space.

DETAILED DESCRIPTION OF THE INVENTION

Technical Problem

The present invention has been made in an effort to solve a problem of an increase in risk of defect such as beam interference, an inflow of spatters into a battery, and weak welding when laser welding is intended to be performed by means of a core in a battery can at an upper end of an opening portion of the battery can.

Technical Solution

An embodiment of the present specification provides a riveting structure of an electrode terminal, the riveting structure including: a battery can opened at one side thereof; an electrode terminal riveted through a through-hole formed in a bottom of the battery can; and a gasket interposed between the battery can and the electrode terminal, in which the electrode terminal includes: a body portion inserted into the through-hole; an outer flange portion extending along an outer surface of the bottom of the battery can from a periphery of a first side of the body portion exposed through the outer surface of the bottom of the battery can; and an inner flange portion extending toward an inner surface of the bottom of the battery can from a periphery of a second side of the body portion exposed through the inner surface of the bottom of the battery can, in which the body portion and the outer flange portion respectively have inner cavities connected to each other, and in which the inner flange portion has an opening portion connected to the inner cavities and opened in a direction toward an inside of the battery can.

In the embodiment of the present specification, an inner diameter of at least a part of the inner cavity of the outer flange portion may be larger than an inner diameter of the body portion.

In the embodiment of the present specification, an inner diameter of at least a part of the inner cavity of the outer flange portion may decrease in a direction from outside to the inside the battery can.

In the embodiment of the present specification, a lateral thickness of the body portion of the electrode terminal may be 5% or more and 40% or less of a maximum inner width of the body portion.

In the embodiment of the present specification, a maximum width of an outer surface of the outer flange portion may be 10% or more and 40% or less of a maximum width of the bottom of battery can.

Another embodiment of the present specification provides a secondary battery including: an electrode assembly wound in a state in which a separator is interposed between a first electrode and a second electrode, each electrode having a sheet shape, the electrode assembly including a non-coated portion of the first electrode extending from two opposite ends of the first electrode and exposed, and a non-coated portion of the second electrode extending from two opposite ends of the second electrode and exposed; a battery can configured to accommodate the electrode assembly and electrically connected to the second electrode; an electrode terminal electrically connected to the first electrode and riveted through a through-hole formed in a bottom of the battery can, the electrode terminal including: a body portion inserted into the through-hole; an outer flange portion extending along an outer surface of the bottom of the battery can from a periphery of a first side of the body portion exposed through the outer surface of the bottom of the battery can; and an inner flange portion extending toward an inner surface of the bottom of the battery can from a periphery of a second side of the body portion exposed through the inner surface of the bottom of the battery can, in which the body portion and the outer flange portion respectively have inner cavities connected to each other, and in which the inner flange portion has an opening portion connected to the inner cavities and opened in a direction toward an inside of the battery can; a first current collecting plate electrically connected to the non-coated portion of the first electrode; a gasket interposed between the electrode terminal and the through-hole; and a sealing body config- ured to seal an opening end of the battery can so as to be insulated from the battery can.

In the embodiment of the present specification, the non- coated portion of the first electrode may be welded and electrically connected to the first current collecting plate.

In the embodiment of the present specification, the first current collecting plate may further include: a fastening part inserted and fitted into the inner cavities of the body portion and the outer flange portion of the electrode terminal through the opening portion of the inner flange portion of the electrode terminal, and the fastening part of the first current collecting plate may be electrically connected to at least a part of an inner surface of the body portion of the electrode terminal.

In the embodiment of the present specification, the first current collecting plate may be electrically connected to an inner surface of the inner flange portion of the electrode terminal.

In the embodiment of the present specification, the fas- tening part of the first current collecting plate may be electrically connected to at least a part of an inner surface of the outer flange portion of the electrode terminal.

In the embodiment of the present specification, an inner diameter of at least a part of the inner cavity of the outer flange portion of the electrode terminal may be larger than an inner diameter of the body portion of the first current collecting plate, and at least one end of the fastening part of the first current collecting plate may have a protrusion so as to contact the outer flange portion.

In the embodiment of the present specification, an outer diameter of the fastening part of the first current collecting plate may be larger than an inner diameter of the body portion of the electrode terminal.

In the embodiment of the present specification, a ratio between an outer diameter of the fastening part of the first current collecting plate and an inner diameter of the body portion of the electrode terminal may be 1:1 to 1.01:1.

In the embodiment of the present specification, a ratio between a maximum outer diameter of a portion where the protrusion of the fastening part of the first current collecting plate may be provided and an inner diameter of the body portion of the electrode terminal is 1.005:1 to 1.1:1.

The embodiment of the present specification provides a battery pack including a plurality of secondary batteries described above.

The embodiment of the present specification provides a vehicle including at least one battery pack described above.

Advantageous Effects

According to one aspect of the present invention, it is possible to improve the electrode terminal structure of the secondary battery, thereby solving difficulty in performing welding in a narrow space, preventing an increase in risk of defect caused by occurrence of welding spatter, and fasten- ing the electrode terminal and the current collecting plate through a simpler process.

BRIEF DESCRIPTION OF DRAWINGS

FIG. 1 is a top plan view illustrating a structure of an electrode plate used for a secondary battery.

FIG. 2 is a view illustrating a process of winding an electrode assembly included in the secondary battery.

FIG. 3 is a view illustrating a process of welding a current collecting plate to a bent surface of a non-coated portion of the electrode assembly illustrated in FIG. 2.

FIG. 4 is a view illustrating a case in which spatters are formed when a rivet-type electrode terminal and a current collecting plate is welded in the related art.

FIG. 5 is a view schematically illustrating a process in which an electrode terminal and a first current collecting plate according to an embodiment of the present specifica- tion are fitted.

FIG. 6 is a view schematically illustrating a riveting structure of the electrode terminal according to the embodi- ment of the present specification.

FIG. 7 is a cross-sectional view a state in which protru- sions are formed on a fastening part of the first current collecting plate.

FIG. 8 is a view exemplarily illustrating a shape of the first current collecting plate according to the present speci- fication.

FIG. 9 is a cross-sectional view taken in a longitudinal direction Y and illustrating a secondary battery according to the embodiment of the present specification.

FIG. 10 is a top plan view exemplarily illustrating a structure of an electrode plate according to the embodiment of the present specification.

FIG. 11 is a cross-sectional view taken in the longitudinal direction Y and illustrating the electrode assembly according to the embodiment of the present specification in which a segmental structure of a non-coated portion of the electrode plate is applied to first and second electrodes.

FIG. 12 is a cross-sectional view taken in the longitudinal direction Y and illustrating the electrode assembly according to the embodiment of the present specification in which a non-coated portion is bent.

FIG. 13 is a view illustrating a schematic configuration of a battery pack including cylindrical battery cells according to the embodiment of the present specification.

FIG. 14 is a view illustrating a schematic configuration of a vehicle including the battery pack according to the embodiment of the present specification.

EXPLANATION OF REFERENCE NUMERALS AND SYMBOLS

71, 100: Electrode assembly
10: Positive plate
11: Negative plate
10a, 73: Non-coated portion of first electrode
11a, 72: Non-coated portion of second electrode
12: Separator
20, 91: Current collector
21, 92: Active material
22, 93: Non-coated portion
30: First current collecting plate
30a: Fastening part
L1: Outer diameter of fastening part of first current collecting plate
L2: Maximum outer diameter of portion where protrusion of fastening part of first current collecting plate is provided
31, 78: Second current collecting plate
50: Electrode terminal
50a: Body portion
R1: Inner diameter of body portion
50b: Outer flange portion 50c: Inner flange portion
51: Battery can
53: Through-hole
54: Gasket
55: Insulator
56: Protrusion
70: Secondary battery
74: Sealing body
74a: Cap plate
74b: Sealing gasket
75: Crimping portion
76: Beading portion
76a: Inner peripheral surface of beading portion
77: Vent notch
78a: At least a part of edge not being in contact with non-coated portion of second electrode
80: Cavity in core of electrode assembly
90: Electrode
93a: Segmental piece
93': Core side non-coated portion
94: Insulating coating layer
200: Battery pack
201: Cylindrical secondary battery cell
202: Pack housing
V: Vehicle
P: Inner cavity
Q: Opening portion
A: Interference-fit

BEST MODE

Hereinafter, the present specification will be described in more detail.

Hereinafter, exemplary embodiments of the present invention will be described in detail with reference to the accompanying drawings. In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Therefore, the exemplary embodiments disclosed in the present specification and the configurations illustrated in the drawings are just the best preferred exemplary embodiments of the present invention and do not represent all the technical spirit of the present invention. Accordingly, it should be appreciated that various equivalents and modified examples capable of substituting the exemplary embodiments may be made at the time of filing the present application.

In addition, to help understand the present invention, the accompanying drawings are not illustrated based on actual scales, but some constituent elements may be exaggerated in dimension. In addition, the constituent elements in different embodiments may be assigned with the same reference numerals.

The expression indicating that the two comparison targets are equal to each other means that the two comparison targets are 'substantially' equal to each other. Therefore, the substantial equality may include a case in which a deviation considered as being at a low level in the art is present, for example, a deviation within 5% is present. In addition, a configuration in which a particular parameter is constant in a predetermined region may mean that the parameter is constant from an average point of view.

In the present specification, the term "on" not only means that a component is positioned on one layer while being in physical contact with the layer but also means that a component is positioned above one layer. That is, another layer may be present between layers positioned on any one layer.

In the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

The present specification provides a riveting structure of an electrode terminal, the riveting structure including: a battery can opened at one side thereof; an electrode terminal riveted through a through-hole formed in a bottom of the battery can; and a gasket interposed between the battery can and the electrode terminal. The electrode terminal includes: a body portion inserted into the through-hole; an outer flange portion extending along an outer surface of the bottom of the battery can from a periphery of one side of the body portion exposed through the outer surface of the bottom of the battery can; and an inner flange portion extending toward an inner surface of the bottom of the battery can from a periphery of the other side of the body portion exposed through the inner surface of the bottom of the battery can. The body portion and the outer flange portion respectively have inner cavities connected to each other, and the inner flange portion has an opening portion connected to the inner cavities and opened in a direction toward the inside of the battery can.

In a case in which a rivet-type electrode terminal in the related art, which penetrates a bottom surface of a battery can, is applied as an electrode terminal of a secondary battery, a welding process for coupling the electrode terminal and a current collecting plate needs to be performed through a jelly-roll core, which makes it difficult to perform welding in a narrow space. In addition, a risk of defect such as beam interference, an inflow of spatters into a battery, and weak welding increases when laser welding is intended to be performed by means of a core in a battery can at an upper end of an opening portion of the battery can.

FIG. 4 is a view illustrating a process of laser-welding a general rivet-type terminal to a current collecting plate and illustrates that spatters formed during the welding may remain as metallic foreign substances in a secondary battery. The metal foreign substances remaining in the secondary battery as described above may cause a fine short circuit.

An electrode terminal 50 according to the present invention has a riveting structure. The electrode terminal 50 is exposed through a through-hole 53 formed in a bottom of a battery can 51 and riveted. In this case, the electrode terminal according to the present invention has therein cavities P, and a current collecting plate 30 is fitted into the inner cavities P of the electrode terminal.

That is, the electrode terminal according to the present invention is not electrically connected to the current collecting plate through electrical connection made by welding but electrically connected to the current collecting plate as the current collecting plate is fitted into and brought into contact with the inner cavities of the electrode terminal. FIG. 5 is a view illustrating a process of forming the electrode terminal having the riveting structure according to the present invention. Referring to the lowermost view in FIG. 5, the current collecting plate and the electrode terminal according to the present invention are fitted with each other in the cavities formed in the electrode terminal at a portion indicated by dotted lines.

Therefore, a secondary battery, to which the riveting structure of the electrode terminal according to the present invention is applied, does not use a welding process to couple the electrode terminal and the current collecting plate. Therefore, it is possible to prevent a risk of defect caused by beam interference or welding spatters.

The electrode terminal according to the present invention has the riveting structure and is riveted through the through-hole formed in the bottom of the battery can. The gasket is provided between the battery can and the electrode terminal.

FIG. 5 is a view illustrating a process of processing and riveting the electrode terminal positioned in the through-hole of the battery can according to the present invention. The riveting structure of the electrode terminal is formed by bending an upper surface of the electrode terminal so that an outer diameter of a portion the electrode terminal, which is exposed to the outside of the battery can, is larger than an outer diameter of the through-hole of the battery can. In this case, a portion of the gasket, which is exposed to the outside of the battery can, is also bent by an angle equal to an angle by which the electrode terminal is bent during a process of pressing the electrode terminal with a pressure. The outer diameter of the through-hole means a diameter of the through-hole.

The electrode terminal according to the present invention, which has been processed as described above, includes: a body portion 50a inserted into the through-hole 53; an outer flange portion 50b extending along an outer surface 52a of a bottom 52 of the battery can 51 from a periphery of one side of the body portion 50a exposed through the outer surface 52a of the bottom 52 of the battery can 51; and an inner flange portion 50c extending toward an inner surface 52b of the bottom 52 of the battery can 51 from a periphery of the other side of the body portion 50a exposed through the inner surface 52b of the bottom 52 of the battery can 51. The body portion 50a and the outer flange portion 50b respectively have the inner cavities P connected to each other, and the inner flange portion 50c has an opening portion Q connected to the inner cavities P and opened in a direction toward the inside of the battery can 51. In this case, the body portion, the outer flange portion, and the inner flange portion are terms for defining a region constituting the electrode terminal.

FIG. 6 is a cross-sectional view taken in the longitudinal direction of the riveting structure of the electrode terminal according to the present invention. A region indicated by the dotted line in the portion of the electrode terminal exposed to the outside of the battery can is the outer flange portion 50b, and a region indicated by the dotted line and provided in the through-hole of the battery can is the body portion 50a. A portion indicated by the dotted line in the portion of the electrode terminal extending toward an inner surface of the bottom of the battery can is the inner flange portion 50c. The body portion and the outer flange portion respectively include the inner cavities connected to each other and indicated by P in FIG. 6. The inner flange portion has the opening portion indicated by Q in FIG. 6, and the opening portion Q is connected to the inner cavity P.

In the embodiment of the present specification, an inner diameter of at least a part of the inner cavity of the outer flange portion may be larger than an inner diameter of the inner cavity of the body portion. Since the inner diameter of at least a part of the inner cavity of the outer flange portion is larger than the inner diameter of the inner cavity of the body portion, one end of the current collecting plate to be described below is in contact with an inner surface of the outer flange portion, such that the current collecting plate may be fixed so as not to move upward or downward.

In the embodiment of the present specification, the inner diameter of at least a part of the inner cavity of the outer flange portion may decrease in the direction from outside to inside the battery can. One end of the current collecting plate to be described below may be more strongly fixed to the inner surface of the outer flange portion by a section in which the inner diameter of at least a part of the inner cavity of the outer flange portion decreases.

In the embodiment of the present specification, an inner surface of the body portion of the electrode terminal may be connected to an inner surface of the inner flange portion without fluctuation.

In the embodiment of the present specification, a thickness of the body portion of the electrode terminal is constant.

In the embodiment of the present specification, a maximum length between the inner surfaces of the body portion of the electrode terminal may be equal to or smaller than a maximum length between the inner surfaces of the outer flange portion of the electrode terminal.

In the embodiment of the present specification, the outer flange portion of the electrode terminal may include a region having different thicknesses.

In the embodiment of the present specification, a thickness t1 of at least a part of the outer flange portion of the electrode terminal may be larger than a lateral thickness t2 of the body portion. The lateral thickness of the body portion means a distance between the outer and inner surfaces of the body portion of the electrode terminal and is indicated by reference numeral t2 in FIG. 6.

In the embodiment of the present specification, the lateral thickness of the body portion of the electrode terminal may be 5% or more and 40% or less, 7% or more and 40% or less, 10% or more and 35% or less, or 10% or more and 25% or less of the inner diameter R1 of the body portion of the electrode terminal. The inner diameter of the body portion means a distance between the inner surfaces of the body portion and is indicated by R1 in FIG. 6.

When the above-mentioned range is satisfied, durability of the body portion may be increased. Therefore, even though the current collecting plate to be described below is fitted into the inner cavity of the body portion in an inter-ference-fit manner, it is possible to easily rivet the electrode terminal while preventing damage to the body portion of the electrode terminal.

In the embodiment of the present specification, the inner diameter of the body portion, the maximum inner diameter of the inner cavity of the outer flange portion, and the inner diameter of the opening portion of the inner flange portion may be designed in accordance with the thickness of the body portion of the electrode terminal, the diameter of the through-hole of the battery can, and the thickness of the gasket. Specifically, the inner diameter of the body portion, the maximum inner diameter of the inner cavity of the outer flange portion, and the inner diameter of the opening portion of the inner flange portion may be designed such that an inner gap in the battery can may be blocked by the riveted electrode terminal, the current collecting plate to be described below may be easily fixed in an interference-fit manner, and the fastening part of the current collecting plate is easily inserted.

In the embodiment of the present specification, the inner diameter of the body portion may be 4 mm or more and 11 mm or less, 4 mm or more and 8 mm or less, and 5 mm or more and 8 mm or less.

In the embodiment of the present specification, the maximum inner diameter of the inner cavity of the outer flange portion may be 5 mm or more and 15 mm or less, 7 mm or more and 12 mm or less, or 9 mm or more and 12 mm or less.

In the embodiment of the present specification, the inner diameter of the opening portion of the inner flange portion may be 4 mm or more and 11 mm or less, 5 mm or more and 10 mm or less, or 7 mm or more and 10 mm or less.

In the embodiment of the present specification, the maximum length of the outer surface of the outer flange portion may be 10% or more and to 40% or less, 15% or more and 35% or less, or 20% or more and 30% or less of the maximum length of the bottom of the battery can.

When the above-mentioned range is satisfied, it is possible to appropriately ensure a space in which electric wiring components such as a busbar may be welded to the electrode terminal.

In the embodiment of the present specification, the electrode terminal 50 is made of a conductive metallic material. For example, the electrode terminal 50 may be made of aluminum, but the present invention is not limited thereto.

In the embodiment of the present specification, the battery can 51 is made of a conductive metallic material. For example, the battery can 51 may be made of steel, but the present invention is not limited thereto.

In the embodiment of the present specification, the gasket 54 may be made of polymer resin having insulation and elasticity. For example, the gasket 54 may be made of polypropylene, polybutylene terephthalate, polyfluorinated ethylene, or the like, but the present invention is not limited thereto.

In the embodiment of the present specification, upper and lower ends of the inner wall of the through-hole 53 perpendicular to the bottom of the battery can 51 are chamfered (corner-cutting) to form tapered surfaces toward the electrode terminal 50. However, the upper end and/or the lower end of the inner wall of the through-hole 53 may be modified to a soft curved surface having a curvature. In this case, it is possible to further mitigate stress applied to the gasket 54 at the periphery of the upper end and/or the lower end of the inner wall of the through-hole 53.

According to the embodiment of the present specification, the riveting structure of the electrode terminal 50 may be formed by using a caulking jig configured to move upward and downward, a spinning process, or rotary riveting. First, a preform (not illustrated) of the electrode terminal 50, to which the gasket is coupled, is inserted into the through-hole 53 formed in the bottom 52 of the battery can 51. The preform refers to an electrode terminal before being riveted.

For example, the preform of the electrode terminal may be processed to the riveted electrode terminal by using an outer caulking jig outside the battery can, and an inner caulking jig may be inserted into the internal space of the battery can, thereby preventing inner deformation of the outer caulking jig.

When the pressing forming of the preform using the caulking jig is completed and then the caulking jig is separated from the battery can 51, the riveting structure of the electrode terminal 50 according to the present invention may be obtained, as illustrated in FIG. 6.

The gasket 54 may be sufficiently compressed to ensure excellent sealing strength without being physically damaged during the process of riveting the preform.

In the embodiment of the present specification, in a case in which the gasket 54 is made of polybutylene terephthalate, compressibility of the gasket 54 may be 50% or more at a point at which the gasket 54 is compressed to a minimum thickness. The compressibility is a ratio of change in thickness between before and after compression with respect to the thickness before compression.

In the embodiment of the present specification, in a case in which the gasket 54 is made of polyfluoroethylene, compressibility of the gasket 54 may be 60% or more at the point at which the gasket 54 is compressed to the minimum thickness.

In the embodiment of the present specification, in a case in which the gasket 54 is made of polypropylene, compressibility of the gasket 54 may be 60% or more at the point at which the gasket 54 is compressed to the minimum thickness.

The riveting structure of the electrode terminal according to the present invention may be applied to a secondary battery. The secondary battery includes: an electrode assembly having first and second electrodes each having a sheet shape and wound with a separator interposed therebetween, the electrode assembly including a non-coated portion of a first electrode extending from two opposite ends and exposed, and a non-coated portion of the second electrode; and a first current collecting plate welded to the non-coated portion of the first electrode; a gasket positioned between the electrode terminal and the through-hole; and a sealing body configured to seal an opening end of the battery can so that the sealing body is insulated from the battery can.

In the embodiment of the present specification, the electrode terminal may be coupled and electrically connected to the first current collecting plate. Specifically, the electrode terminal is coupled and electrically connected directly to the first current collecting plate instead of being electrically connected to the first current collecting plate by welding.

The first current collecting plate may further include a fastening part inserted and fitted into the inner cavities of the body portion and the outer flange portion of the electrode terminal through the opening portion of the inner flange portion of the electrode terminal. The fastening part may be electrically connected to at least a part of the inner surface of the body portion. More specifically, the fastening part may be electrically connected to and in direct contact with at least a part of the inner surface of the body portion. FIG. 8 is a view exemplarily illustrating a shape of the first current collecting plate according to the present invention. The fastening part having a cylindrical shape is coupled to a central portion of the current collecting plate having a disc shape.

Since the first current collecting plate according to the present invention includes the fastening part, the first current collecting plate may be coupled to the electrode terminal without a welding process. Further, the electrode terminal and the first current collecting plate have a larger contact surface than a riveted electrode terminal structure in the related art, such that the first current collecting plate may be smoothly electrically connected to the electrode terminal, and high resistance of the first current collecting plate may be reduced.

In the embodiment of the present specification, the fastening part of the first current collecting plate may include a cavity therein.

In the embodiment of the present specification, a height of the fastening part of the first current collecting plate may be 2 mm or more and 8 mm or less, 3 mm or more and 7 mm or less, or 4 mm or more and 6 mm or less.

In the embodiment of the present specification, the first current collecting plate may be electrically connected to the inner surface of the inner flange portion of the electrode terminal. More specifically, the first current collecting plate may be electrically connected to and in direct contact with the inner surface of the inner flange portion of the electrode terminal.

A surface of the first current collecting plate according to the present specification, which is opposite to the surface coupled to the non-coated portion of the first electrode, may be electrically connected to the inner surface of the inner flange portion of the electrode terminal, and more specifically, electrically connected to and in direct contact with the inner surface of the inner flange portion of the electrode terminal.

In the embodiment of the present specification, the fastening part may be electrically connected to at least a part of the inner surface of the outer flange portion. More specifically, the fastening part may be electrically connected to and in direct contact with at least a part of the inner surface of the outer flange portion.

FIGS. 5 and 6 illustrate that the fastening part of the first current collecting plate is in direct contact with the electrode terminal.

The connection structure between the first current collecting plate and the electrode terminal according to the present specification corresponds to the interference-fit coupling structure between the electrode terminal and the first current collector. That is, according to the present invention, it is possible to eliminate a risk caused by a welding process by using the physical contact connection between the electrode terminal and the first current collecting plate having the fastening part. Referring to FIG. 5, the state in which the outer surface of the fastening part of the first current collecting plate and the inner surface of the body portion of the electrode terminal are coupled in an interference-fit manner is indicated by A.

In the embodiment of the present specification, an outer diameter L1 of the fastening part of the first current collecting plate may be larger than the inner diameter R1 of the body portion of the electrode terminal.

In the embodiment of the present specification, a ratio between the outer diameter L1 of the fastening part of the first current collecting plate and the inner diameter R1 of the body portion of the electrode terminal may be 1:1 to 1.01:1, 1:1 to 1.008:1, or 1:1 to 1.005:1. When the range is satisfied, a fixing force of the fastening part of the current collecting plate may be enhanced.

Referring to FIG. 5, the outer diameter of the fastening part of the first current collecting plate means a diameter of an outer surface of the fastening part facing the inner surface of the body portion of the electrode terminal and is indicated by L1 in FIG. 5.

In the embodiment of the present specification, an inner diameter of at least a part of the inner cavity of the outer flange portion may be larger than the inner diameter of the body portion, and at least one end of the fastening part may have a protrusion so as to be riveted in the outer flange portion. For example, the protrusion may be positioned at a lateral side of the fastening part positioned in the inner cavity of the outer flange portion.

Referring to FIG. 7, the protrusion of the fastening part of the first current collecting plate is riveted in the inner cavity of the electrode terminal in an interference-fit manner. Since both the first current collecting plate and the electrode terminal are made of a conductive metallic material, the respective components may be riveted by being finely deformed when the protrusion of the first current collecting plate is fitted into the inner cavity of the electrode terminal by a high force.

A maximum outer diameter L2 of a portion where the protrusion of the fastening part of the first current collecting plate is provided may be larger than the inner diameter R1 of the body portion of the electrode terminal.

In the embodiment of the present specification, a ratio between the maximum outer diameter L2 of the portion where the protrusion of the fastening part of the first current collecting plate is provided and the inner diameter R1 of the body portion of the electrode terminal may be 1.005:1 to 1.1:1, 1.005:1 to 1.05:1, 1.005:1 to 1.03:1, 1.005:1 to 1.02:1, or 1.005:1 to 1.015:1.

When the range is satisfied, the fixing force may be enhanced, and the protrusion is caught by a boundary between the body portion and the outer flange portion of the electrode terminal in a state in which the interference-fit is completed, thereby preventing the first current collecting plate from being separated in a direction opposite to a direction in which the first current collecting plate is inserted.

Referring to FIG. 7, the maximum outer diameter L2 of the portion where the protrusion of the fastening part is provided means the outer diameter of the fastening part based on a portion where the protrusion extending from the outer surface of the fastening part protrudes to the largest extent. The maximum outer diameter is indicated by L2 in FIG. 7.

Therefore, in the case in which the riveting structure of the electrode terminal according to the present invention is used, an additional welding process may not be performed to implement the electrical connection between the current collecting plate and the electrode terminal.

The first current collecting plate according to the present invention is electrically connected and coupled to the electrode assembly.

In the embodiment of the present specification, the electrode assembly 100 is wound in the state in which the separator is interposed between the first and second electrodes each having a sheet shape. The electrode assembly 100 includes the non-coated portion of the first electrode extending from the two opposite ends of the first electrode and exposed, and the non-coated portion of the second electrode extending from the two opposite ends of the second electrode and exposed.

For example, the electrode assembly according to the embodiment of the present specification may have a jelly-roll structure. The electrode assembly may be manufactured by interposing a separator between the first and second electrodes having the sheet shape, stacking the separator and the first and second electrodes at least once to form a stack, and winding the stack around a winding central portion.

That is, the positive and negative plates each have a structure in which a current collector 20 having a sheet shape is coated with an active material 21 and include a non-coated portion 22 disposed at one long side based on the winding direction. In this case, an additional separator may be provided on an outer peripheral surface of the electrode assembly 100 to implement insulation from the battery can 51. The jelly-roll structure known in the art may be applied to the present invention without limitation.

FIG. 1 illustrates a structure of the current collector according to the embodiment of the present specification, FIG. 2 illustrates a process of winding the current collector according to the embodiment of the present specification, and FIG. 3 illustrates a process of welding the current collecting plate to the bent surface of the non-coated portion according to the embodiment of the present specification.

Referring to FIGS. 1 to 3, the positive and negative plates 10 and 11 each have the structure in which the current collector 20 having the sheet shape is coated with the active material 21 and include the non-coated portion 22 disposed at one long side based on the winding direction X.

The electrode assembly is manufactured by sequentially stacking the positive plate 10 and the negative plate 11 together with two sheets of separators 12 to form a stack, as illustrated in FIG. 2, and then winding the stack in one direction X. In this case, the non-coated portion of the positive plate 10 and the non-coated portion of the negative plate 11 are disposed in opposite directions. After the winding process, the non-coated portion 10a of the positive plate 10 and the non-coated portion 11a of the negative plate 11 are bent toward the core. Thereafter, the current collecting plate 30 and the second current collecting plate 31 are respectively coupled to the non-coated portions 10a and 11a by welding.

The separate electrode tab is not coupled to the positive electrode non-coated portion 10a and the negative electrode non-coated portion 11a, and the current collecting plate 30 and the second current collecting plate 31 are connected to the external electrode terminals. Therefore, a current path having a large cross-sectional area is formed in the direction of the winding axis of the electrode assembly A (see the arrow), thereby reducing the resistance of the secondary battery. This is because the resistance is inversely proportional to a cross-sectional area of a passageway through which current flows.

In the embodiment of the present specification, the first electrode includes a first current collector and an electrode active material layer provided on one surface or two opposite surfaces of the first current collector. The non-coated portion of the first electrode, which does not have the electrode active material layer, is present at a long side end of a winding direction of the first current collector provided at one end of a winding axis of the electrode assembly. The non-coated portion of the first electrode is provided at an upper side in a height direction (a direction parallel to a Z-axis) of the electrode assembly accommodated in the battery can. That is, the first current collector includes the non-coated portion of the first electrode disposed at the long side end thereof and exposed to the outside of the separator, and the non-coated portion of the first electrode is not coated with the electrode active material.

In the embodiment of the present specification, the second electrode includes a second electrode current collector and a second electrode active material layer provided on one surface or two opposite surfaces of the second electrode current collector. A non-coated portion of the second electrode is present at the other side end in a width direction (a direction parallel to the Z-axis) of the second electrode current collector, and the non-coated portion of the second electrode does not include the second electrode active material layer.

The non-coated portion of the second electrode is provided at a lower side in the height direction (direction parallel to the Z-axis) of the electrode assembly accommodated in the battery can. That is, the second electrode current collector may include a second non-coated portion disposed at a long side end thereof and exposed to the outside of the separator, and the second non-coated portion is not coated with the electrode active material layer.

In the embodiment of the present specification, the first electrode may be a positive plate, and the second electrode may be a negative plate.

In the embodiment of the present specification, the first electrode may be a negative plate, and the second electrode may be a positive plate.

In the embodiment of the present specification, any active material publicly known in the art may be used, without limitation, as the positive electrode active material applied onto the positive plate and the negative electrode active material applied onto the negative plate.

As an example, the positive electrode active material may include alkaline metal compound expressed by a general chemical formula $A[A_xM_y]O_{2+z}$ (A includes one or more elements among Li, Na, and K, M includes one or more elements selected from Ni, Co, Mn, Ca, Mg, Al, Ti, Si, Fe, Mo, V, Zr, Zn, Cu, Al, Mo, Sc, Zr, Ru, and Cr, $x \geq 0$, $1 \leq x+y \leq 2$, and $-0.1 \leq z \leq 2$ in which stoichiometric coefficients x, y, and z are selected so that the compound is kept neutral electrically).

As another example, the positive electrode active material may be alkaline metal compound $xLiM^1O_2 \cdot (1-x)Li_2M_2O_3$ ($M^1$ includes one or more elements having average oxidation state 3, $M^2$ includes one or more elements having average oxidation state 4, and $0 \leq x \leq 1$) disclosed in U.S. Pat. Nos. 6,677,082, 6,680,143, and the like.

As still another example, the positive electrode active material may be lithium metal phosphate expressed by a general chemical formula $Li_aM^1_xFe_{1-x}M^2_yP_{1-y}M^3_zO_{4-z}$ ($M^1$ includes one or more elements selected from Ti, Si, Mn, Co, Fe, V, Cr, Mo, Ni, Nd, Al, Mg, and Al, $M^2$ includes one or more elements selected from Ti, Si, Mn, Co, Fe, V, Cr, Mo, Ni, Nd, Al, Mg, Al, As, Sb, Si, Ge, V, and S, $M^3$ includes halogen family elements selectively including F, $0 < a \leq 2$, $0 \leq x \leq 1$, $0 \leq y < 1$, and $0 \leq z < 1$ in which stoichiometric coefficients a, x, y, and z are selected so that the compound is kept neutral electrically) or $Li_3M_2(PO_4)_3$ (M includes one or more elements selected from Ti, Si, Mn, Fe, Co, V, Cr, Mo, Ni, Al, Mg, and Al)

In particular, the positive electrode active material may include primary particles and/or secondary particles in which the primary particles are agglomerated.

As an example, carbon materials, lithium metal or lithium metal compound, silicon or silicon compound, tin or tin compound, and the like may be used as the negative electrode active material. A metal oxide such as $TiO_2$ and $SnO_2$ having electric potential of less than 2 V may be used as the negative electrode active material. Both low-crystalline carbon and/or high-crystalline carbon may be used as the carbon material.

In the embodiment of the present specification, a porous polymer film, for example, a porous polymer film made of polyolefin-based polymer such as ethylene homopolymer, propylene homopolymer, ethylene/butene copolymer, ethylene/hexene copolymer, or ethylene/methacrylate copolymer may be used singly as the separator or a stake of the porous polymer films may be used as the separator. As another example, a typical porous non-woven fabric, for example, a non-woven fabric made of high-melting point fiberglass, polyethylene terephthalate fiber, or the like may be used as the separator.

At least one surface of the separator may include a coating layer containing inorganic particles. In addition, the separator itself may be a coating layer containing inorganic particles. The particles constituting the coating layer may be coupled by a binder so that an interstitial volume is present between the adjacent particles.

The inorganic particles may be made of inorganic substance with permittivity of 5 or more. As a non-restrictive example, the inorganic particle may include one or more substances selected from a group consisting of $Pb(Zr,Ti)O_3$ (PZT), $Pb_{1-x}La_xZr_{1-y}Ti_yO_3$ (PLZT), $PB(Mg_3Nb_{2/3})O_{3-}$ $PbTiO_3$ (PMN-PT), $BaTiO_3$, hafnia($HfO_2$), $SrTiO_3$, $TiO_2$, $Al_2O_3$, $ZrO_2$, $SnO_2$, $CeO_2$, MgO, CaO, ZnO, and $Y_2O_3$.

The electrolyte may be salt having a structure such as $A^+B^-$. In this case, $A^+$ includes ions including alkaline metal cations such as $Li^+$, $Na^+$, and $K^+$ or a combination thereof. Further, $B^-$ includes one or more anions selected from a group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^{--}$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition, the electrolyte may be dissolved in an organic solvent and used. Propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof may be used as the organic solvent.

In the embodiment of the present specification, the non-coated portion of the first electrode and/or the second electrode may be bent toward the core from the outer periphery of the electrode assembly, thereby forming bent surfaces at the upper and lower portions of the electrode assembly. In addition, the current collecting plate may be welded to the bent surface formed by bending the non-coated portion of the first electrode, and the second current collecting plate may be welded to the bent surface formed by bending the non-coated portion of the second electrode.

The first electrode and/or the second electrode may have different structures to mitigate stress generated when the non-coated portion of the first electrode and/or the second electrode is bent. FIG. 12 is a top plan view exemplarily illustrating a structure of an electrode 90 according to the embodiment of the present invention.

Referring to FIG. 10, the electrode 90 includes a current collector 91 having a sheet shape, an active material layer 92 formed on at least one surface of the current collector 91, and a non-coated portion 93 disposed at a long side end of the current collector 91, and the non-coated portion 93 is not coated with an active material.

The non-coated portion 93 may include a plurality of notched segmental pieces 93a. The plurality of segmental pieces 93a constitutes a plurality of groups, and the segmental pieces 93a included in each of the groups may have the same height (length in a Y direction), and/or the same width (length in an X direction), and/or the same spacing pitch. The number of segmental pieces 93a included in each of the groups may further increase or decrease than illustrated. The segmental piece 93a may have a trapezoidal shape and be modified in a quadrangular, parallelogrammatic, semi-circular, or semi-elliptical shape. In particular, the height of the segmental piece 93a may increase in a stepwise manner in the direction from the core to the outer periphery. In addition, a core side non-coated portion 93' disposed adjacent to the core may not include the segmental piece 93a, and the core side non-coated portion 93' may have a smaller height than other non-coated portion regions.

In the embodiment of the present specification, the electrode 90 may include an insulating coating layer 94 configured to cover a boundary between the active material layer 92 and the non-coated portion 93. The insulating coating layer 94 contains polymer resin with insulation and may further selectively include an inorganic filler. The insulating coating layer 94 serves to prevent an end of the active material layer 92 from coming into contact with an active material layer having an opposite polarity and facing the active material layer 92 through the separator. The insulating coating layer 94 serves to structurally support the bent portion of the segmental piece 93a. To this end, at least a part of the insulating coating layer 94 may be exposed to the outside from the separator when the electrode 90 is wound as the electrode assembly.

FIG. 10 is a cross-sectional view taken in the longitudinal direction Y and illustrating the electrode assembly A according to the embodiment of the present specification in which a segmental structure of the non-coated portion of the electrode 90 is applied to first and second electrodes.

Referring to FIG. 11, a non-coated portion 72 protruding downward extends from the first electrode, and a non-coated portion 73 protruding upward extends from the second electrode. The pattern in which heights of the non-coated portions 72 and 73 are changed is schematically illustrated. That is, the heights of the non-coated portions 72 and 73 may be irregularly changed depending on positions at which cross-sections are formed. For example, when a side portion of the trapezoidal segmental piece 93a is cut, a height of the non-coated portion is smaller than a height of the segmental piece 93a in a cross-sectional view. Therefore, it should be understood that the heights of the non-coated portions 72 and 73 illustrated in the drawing illustrating a cross-section of the electrode assembly A correspond to an average height of the non-coated portion included in the respective winding turns.

As illustrated in FIG. 12, the non-coated portions 72 and 73 may be bent toward the core from the outer periphery of the electrode assembly A. FIG. 11 illustrates bent parts 101 indicated by boxed with dotted lines. When the non-coated portions 72 and 73 are bent, the segmental pieces radially adjacent to one another are superimposed in multiple layers, such that bent surfaces 102 are formed at upper and lower portions of the electrode assembly A. In this case, the core side non-coated portion (93' in FIG. 10) has a small height and thus is not bent. A height h of the segmental piece, which is bent at the innermost side, is equal to or smaller than a radial length r of a winding region formed by the core side non-coated portion 93' having no segmental piece structure. Therefore, a cavity 80 positioned at the core of the electrode assembly A is not closed by the bent segmental pieces. When the cavity 80 is not closed, there is no difficulty in the process of injecting the electrolyte, and efficiency in injecting the electrolyte is improved.

Referring to FIG. 9, the secondary battery according to the embodiment of the present invention includes the cylindrical battery can 51 configured to accommodate the electrode assembly 71 and electrically connected to the non-coated portion 72 of the first electrode. The battery can 51 is opened at one side (the lower side). In addition, the bottom 52 of the battery can 51 has a structure in which the above-mentioned electrode terminal 50 is riveted into the through-hole 53 through the caulking process.

In the embodiment of the present specification, the secondary battery may include the gasket provided between the electrode terminal and the through-hole.

Referring to FIG. 9, the secondary battery 70 according to the embodiment of the present specification may include a sealing body 74 configured to seal the opening end of the battery can 51 so as to be insulated from the battery can 51. In particular, the sealing body 74 may include a cap plate 74a having no polarity, and a sealing gasket 74b interposed between an edge of the cap plate 74a and the opening end of the battery can 51.

In the present specification, the cap plate 74a may be made of a conductive metallic material such as aluminum, steel, or nickel. In addition, the sealing gasket 74b may be made of polypropylene, polybutylene terephthalate, polyfluorinated ethylene, or the like having insulation and elasticity. However, the present invention is not limited by the material of the cap plate 74a and the sealing gasket 74b.

In the embodiment of the present specification, the cap plate 74a may include a vent notch 77 that bursts when a pressure in the battery can 51 exceeds a critical value. The vent notches 77 may be formed at two opposite surfaces of the cap plate 74a. The vent notch 77 may be formed in the surface of the cap plate 74a while having a continuous or discontinuous circular pattern, a straight pattern, or other patterns.

In the embodiment of the present specification, the battery can 51 may include a crimping portion 75 extending and bent toward the inside of the battery can 51 and configured to surround and fix the edge of the cap plate 74a together with the sealing gasket 74b in order to fix the sealing body 74.

In the embodiment of the present specification, the battery can 51 may also include a beading portion 76 press-fitted into the battery can 51 in a region adjacent to the opening end. The beading portion 76 supports an edge of the sealing body 74, particularly, an outer periphery surface of the sealing gasket 74b when the sealing body 74 is fixed by the crimping portion 75.

In the embodiment of the present specification, the secondary battery may further include the second current collecting plate 31 welded to the non-coated portion 73 of the second electrode. The second current collecting plate 31 is made of a conductive metallic material such as aluminum, steel, or nickel.

In the embodiment of the present specification, at least a part 78a of an edge of the second current collecting plate 31, which is not in contact with the non-coated portion 72 of the second electrode, may be interposed between the beading portion 76 and the sealing gasket 74b and fixed by the crimping portion 75.

Selectively, at least a part 78a of the edge of the second current collecting plate 31 may be fixed, by welding, to an inner peripheral surface 76a of the beading portion 76 adjacent to the crimping portion 75.

In the embodiment of the present specification, an insulator may be provided between the first current collecting plate and the inner surface of the battery can. The insulator prevents the contact between the first current collecting plate and the battery can. The insulator may also be interposed between an upper end of the outer peripheral surface of the electrode assembly and the inner surface of the battery can. That is, the insulator may also be interposed between the non-coated portion of the first electrode and an inner surface of a sidewall portion of the battery can. This is to prevent the contact between the inner peripheral surface of the battery can and the non-coated portion of the first electrode extending toward a closed portion of the battery can.

In the embodiment of the present specification, the non-coated portions 72 and 73 of the first electrode and/or the second electrode are bent from the outer periphery toward the core of the electrode assembly 71, such that the bent surfaces may be formed at the upper and lower sides of the electrode assembly 71. In addition, the first current collecting plate 30 may be welded to the bent surface formed by bending the non-coated portion 72 of the first electrode, and the second current collecting plate 31 may be welded to the bent surface formed by bending the non-coated portion 73 of the second electrode.

To mitigate stress occurring at the time of bending the non-coated portions 72 and 73, the first electrode and/or the second electrode may have the improved structure different from the structure of the electrode plate illustrated in FIG. 1. FIG. 10 is a top plan view exemplarily illustrating a structure of an electrode plate 90 according to the exemplary embodiment of the present invention.

Referring to FIG. 10, the electrode plate 90 includes a current collector 91 having a sheet shape and provided in the form of a foil made of a conductive material, an active material layer 92 formed on at least one surface of the current collector 91, and a non-coated portion 93 disposed at a long side end of the current collector 91, and the non-coated portion 93 is not coated with an active material.

In particular, the non-coated portion 93 may include a plurality of notched segmental pieces 93a. The plurality of segmental pieces 93a constitutes a plurality of groups, and the segmental pieces 93a included in each of the groups may have the same height (length in a Y direction), and/or the same width (length in an X direction), and/or the same spacing pitch. The number of segmental pieces 93a included in each of the groups may further increase or decrease than illustrated. The segmental piece 93a may have a trapezoidal shape and be modified in a quadrangular, parallelogrammatic, semi-circular, or semi-elliptical shape. In particular, the height of the segmental piece 93a may increase in a stepwise manner in the direction from the core to the outer periphery. In addition, a core side non-coated portion 93' disposed adjacent to the core may not include the segmental piece 93a, and the core side non-coated portion 93' may have a smaller height than other non-coated portion regions.

In the embodiment of the present specification, the electrode plate 90 may include an insulating coating layer 94 configured to cover a boundary between the active material layer 92 and the non-coated portion 93. The insulating coating layer 94 contains polymer resin with insulation and may further selectively include an inorganic filler. The insulating coating layer 94 serves to prevent an end of the active material layer 92 from coming into contact with an active material layer having an opposite polarity and facing the active material layer 92 through the separator. The insulating coating layer 94 serves to structurally support the bent portion of the segmental piece 93a. To this end, at least a part of the insulating coating layer 94 may be exposed to the outside from the separator when the electrode plate 90 is wound as the electrode assembly.

FIG. 11 is a cross-sectional view taken in the longitudinal direction Y and illustrating the electrode assembly 100 according to the embodiment of the present invention in which a segmental structure of the non-coated portion of the electrode plate 90 is applied to first and second electrodes.

Referring to FIG. 11, the electrode assembly 100 may be manufactured by the winding method described with reference to FIG. 2. For the convenience of description, the protruding structure of the non-coated portions 72 and 73 extending to the outside of the separator is illustrated in detail, but the illustration of the structure in which the first electrode, the second electrode, and the separator are wound will be omitted. A non-coated portion 72 protruding downward extends from the first electrode, and a non-coated portion 73 protruding upward extends from the second electrode. The pattern in which heights of the non-coated portions 72 and 73 are changed is schematically illustrated.

That is, the heights of the non-coated portions 72 and 73 may be irregularly changed depending on positions at which cross-sections are formed. For example, when a side portion of the trapezoidal segmental piece 93*a* is cut, a height of the non-coated portion is smaller than a height of the segmental piece 93*a* in a cross-sectional view. Therefore, it should be understood that the heights of the non-coated portions 72 and 73 illustrated in the drawing illustrating a cross-section of the electrode assembly 100 correspond to an average height of the non-coated portion included in the respective winding turns.

As illustrated in FIG. 12, the non-coated portions 72 and 73 may be bent toward the core from the outer periphery of the electrode assembly 100. FIG. 11 illustrates bent parts 101 indicated by boxed with dotted lines. When the non-coated portions 72 and 73 are bent, the segmental pieces radially adjacent to one another are superimposed in multiple layers, such that bent surfaces 102 are formed at upper and lower portions of the electrode assembly 100. In this case, the core side non-coated portion (93' in FIG. 10) has a small height and thus is not bent. A height h of the segmental piece, which is bent at the innermost side, is equal to or smaller than a radial length r of a winding region formed by the core side non-coated portion 93' having no segmental piece structure. Therefore, a cavity 80 positioned at the core of the electrode assembly 100 is not closed by the bent segmental pieces. When the cavity 80 is not closed, there is no difficulty in the process of injecting the electrolyte, and efficiency in injecting the electrolyte is improved.

The cap plate 74*a* of the sealing body 74 of the secondary battery 70 according to the embodiment of the present invention has no polarity. Instead, the second current collecting plate 31 is connected to the sidewall of the battery can 51, such that the outer surface 52*a* of the bottom 52 of the battery can 51 has a polarity opposite to the polarity of the electrode terminal 50. Therefore, wiring, such as busbar connection, may be performed above the secondary battery 70 by using the electrode terminal 50 and the outer surface 52*a* of the bottom 52 of the battery can 51 at the time of connecting a plurality of cells in series and/or parallel. Therefore, it is possible to increase the number of cells to be mounted in the same space and increase energy density.

In the embodiment of the present specification, the riveting structure of the electrode terminal 50 may be applied to the cylindrical secondary battery.

In the embodiment of the present specification, the non-coated portion of the first electrode of the electrode assembly may be cut to have the same shape as the current collecting plate.

In the embodiment of the present specification, the bent portion of the non-coated portion of the first electrode of the electrode assembly may be cut to have the same shape as the current collecting plate.

In the embodiment of the present specification, the secondary battery may be a cylindrical secondary battery having a ratio of a form factor larger than 0.4 (the ratio of the form factor is defined as a value made by dividing a diameter of the cylindrical battery by a height of the cylindrical battery, i.e., a ratio of a diameter Φ to a height H). In this case, the form factor means a value indicating the diameter and the height of the cylindrical secondary battery.

In the related art, batteries having the ratio of the form factor of approximately 0.4 or less are used. That is, in the related art, 18650 cell, 21700 cell, and the like are used, for example. In the case of 18650 cell, a diameter thereof is approximately 18 mm, a height thereof is approximately 65 mm, and a ratio of the form factor thereof is approximately 0.277. In the case of 21700 cell, a diameter thereof is approximately 21 mm, a height thereof is approximately 70 mm, and a ratio of the form factor thereof is approximately 0.300.

The cylindrical secondary battery according to the embodiment of the present specification may be 46110 cell, 48750 cell, 48110 cell, 48800 cell, or 46800 cell. In the numerical value indicating the form factor, the first two numbers indicate a diameter of the cell, the next two numbers indicate a height of the cell, and the final number 0 indicates that a cross-section of the cell is circular.

The secondary battery according to the embodiment of the present specification may be a cylindrical secondary battery that is a cylindrical cell and has a diameter of 46 mm, a height of 110 mm, and a ratio of the form factor of 0.418.

The secondary battery according to the embodiment of the present specification may be a cylindrical secondary battery that is a cylindrical cell and has a diameter of 48 mm, a height of 75 mm, and a ratio of the form factor of 0.640.

The secondary battery according to the embodiment of the present specification may be a cylindrical secondary battery that is a cylindrical cell and has a diameter of 48 mm, a height of 110 mm, and a ratio of the form factor of 0.418.

The secondary battery according to the embodiment of the present specification may be a cylindrical secondary battery that is a cylindrical cell and has a diameter of 48 mm, a height of 80 mm, and a ratio of the form factor of 0.600.

The secondary battery according to the embodiment of the present specification may be a cylindrical secondary battery that is a cylindrical cell and has a diameter of 46 mm, a height of 80 mm, and a ratio of the form factor of 0.575.

The secondary battery according to the embodiment of the present specification may be used to manufacture a battery pack. FIG. 13 is a view schematically illustrating a configuration of a battery pack according to an embodiment of the present invention.

Referring to FIG. 13, a battery pack 200 according to the embodiment of the present invention includes an assembly to which a secondary battery cell 201 is electrically connected, and a pack housing 202 configured to accommodate the assembly. The cylindrical secondary battery cell 201 is the secondary battery cell according to the above-mentioned embodiment. For convenience of illustration, components such as busbars for electrical connection between the cylindrical secondary battery cells 201, a cooling unit, and an external terminal are omitted from the drawings.

The battery pack 200 may be mounted on a vehicle. For example, the vehicle may be an electric vehicle, a hybrid vehicle, or a plug-in hybrid vehicle. The vehicle may be a four-wheel vehicle or a two-wheel vehicle. FIG. 14 is a view for explaining a vehicle including the battery pack 200 illustrated in FIG. 13.

Referring to FIG. 14, a vehicle V according to the embodiment of the present specification includes the battery pack 200 according to the embodiment of the present specification. The vehicle V operates by receiving electric power from the battery pack 200 according to the embodiment of the present invention.

The present invention has been described with reference to the limited embodiments and the drawings, but the present invention is not limited thereto. The described embodiments may be changed or modified by those skilled in the art to which the present invention pertains within the technical spirit of the present invention and within the scope equivalent to the appended claims.

The invention claimed is:

1. A riveting structure of an electrode terminal, the riveting structure comprising:

a battery can including an opened end at one side thereof, a bottom opposite to the opened end, and a side wall extending from a periphery of the bottom to the opened end, the bottom and the side wall formed in one piece;

an electrode terminal riveted through a through-hole formed in the bottom of the battery can; and a gasket interposed between the battery can and the electrode terminal, wherein the electrode terminal comprises:

a body portion inserted into the through-hole;

an outer flange portion extending along an outer surface of the bottom of the battery can from a first side of the body portion exposed through the outer surface of the bottom of the battery can; and an inner flange portion extending toward an inner surface of the bottom of the battery can from a periphery of a second side of the body portion exposed through the inner surface of the bottom of the battery can, wherein the body portion and the outer flange portion respectively have inner cavities connected to each other, wherein the inner flange portion has an opening portion connected to the inner cavities and opened in a direction toward an inside of the battery can, wherein a thickness of the bottom of the battery can is greater than a thickness of the side wall of the battery can, and wherein the electrode terminal provides a first electrical connection and an outer surface of the bottom of the battery can provides a second electrical connection having an opposite polarity to the first electrical connection at a same side of the battery can.

2. The riveting structure of claim 1, wherein an inner diameter of at least a part of the inner cavity of the outer flange portion is larger than an inner diameter of the body portion.

3. The riveting structure of claim 1, wherein an inner diameter of at least a part of the inner cavity of the outer flange portion decreases in a direction from an outside to the inside the battery can.

4. The riveting structure of claim 1, wherein a lateral thickness of the body portion of the electrode terminal is 5% or more and 40% or less of a maximum inner width of the body portion.

5. The riveting structure of claim 1, wherein a maximum width of an outer surface of the outer flange portion is 10% or more and 40% or less of a maximum width of the bottom of battery can.

6. A secondary battery comprising:

an electrode assembly wound in a state in which a separator is interposed between a first electrode and a second electrode, each electrode having a sheet shape, the electrode assembly comprising a non-coated portion of the first electrode extending from two opposite ends of the first electrode and exposed, and a non-coated portion of the second electrode extending from two opposite ends of the second electrode and exposed;

a battery can configured to accommodate the electrode assembly and electrically connected to the second electrode, the battery can having an opened end at one side thereof, a bottom opposite to the opened end, and a side wall extending from a periphery of the bottom to the opened end, the side wall and the bottom formed in one piece;

an electrode terminal electrically connected to the first electrode and riveted through a through-hole formed in a bottom of the battery can, the electrode terminal comprising:

a body portion inserted into the through-hole;

an outer flange portion extending along an outer surface of the bottom of the battery can from a first side of the body portion exposed through the outer surface of the bottom of the battery can, wherein the outer flange portion and the body portion are integrally formed; and an inner flange portion extending toward an inner surface of the bottom of the battery can from a periphery of a second side of the body portion exposed through the inner surface of the bottom of the battery can, wherein the body portion and the outer flange portion respectively have inner cavities connected to each other, and wherein the inner flange portion has an opening portion connected to the inner cavities and opened in a direction toward an inside of the battery can;

a first current collecting plate electrically connected to the non-coated portion of the first electrode;

a gasket interposed between the electrode terminal and the through-hole; and a sealing body configured to seal an opening end of the battery can so as to be insulated from the battery can, wherein a thickness of the bottom of the battery can is greater than a thickness of the side wall of the battery can; and wherein the electrode terminal provides a first electrical connection and an outer surface of the bottom of the battery can provides a second electrical connection having an opposite polarity to the first electrical connection at a same side of the battery can.

7. The secondary battery of claim 6, wherein the non-coated portion of the first electrode is welded and electrically connected to the first current collecting plate.

8. The secondary battery of claim 6, wherein the first current collecting plate further comprises:

a fastening part inserted and fitted into the inner cavities of the body portion and the outer flange portion of the electrode terminal through the opening portion of the inner flange portion of the electrode terminal, and wherein the fastening part of the first current collecting plate is electrically connected to at least a part of an inner surface of the body portion of the electrode terminal.

9. The secondary battery of claim 6, wherein the first current collecting plate is electrically connected to an inner surface of the inner flange portion of the electrode terminal.

10. The secondary battery of claim 8, wherein the fastening part of the first current collecting plate is electrically connected to at least a part of an inner surface of the outer flange portion of the electrode terminal.

11. The secondary battery of claim 8, wherein an inner diameter of at least a part of the inner cavity of the outer flange portion of the electrode terminal is larger than an inner diameter of the body portion of the electrode terminal, and at least one end of the fastening part of the first current collecting plate has a protrusion so as to contact the outer flange portion.

12. The secondary battery of claim 8, wherein an outer diameter of the fastening part of the first current collecting plate is larger than an inner diameter of the body portion of the electrode terminal.

13. The secondary battery of claim 8, wherein a ratio between an outer diameter of the fastening part of the first current collecting plate and an inner diameter of the body portion of the electrode terminal is 1:1 to 1.01:1.

14. The secondary battery of claim 11, wherein a ratio between a maximum outer diameter of a portion where the protrusion of the fastening part of the first current collecting plate is provided and an inner diameter of the body portion of the electrode terminal is 1.005:1 to 1.1:1.

15. A battery pack comprising a plurality of secondary batteries according to claim 6.

16. A vehicle comprising at least one of battery pack according to claim 15.

* * * * *